United States Patent [19]
Droesch

[11] Patent Number: 5,427,425
[45] Date of Patent: Jun. 27, 1995

[54] PICKUP TAILGATE MOUNTING ASSEMBLY

[76] Inventor: Joaquin C. Droesch, P.O. Box 1450, Laytonville, Calif. 95454

[21] Appl. No.: 286,206

[22] Filed: Aug. 5, 1994

[51] Int. Cl.⁶ .............................................. B62D 25/00
[52] U.S. Cl. ...................................... 296/50; 296/57.1
[58] Field of Search ..................... 296/50, 51, 52, 57.1, 296/37.6, 180.1; 410/129, 140, 141, 142

[56] References Cited

U.S. PATENT DOCUMENTS

| | | | |
|---|---|---|---|
| 3,265,433 | 8/1966 | Shea | 296/57.1 |
| 4,875,730 | 10/1989 | Justice | 296/37.6 X |
| 5,039,154 | 8/1991 | Lewis | 296/52 |
| 5,207,469 | 5/1993 | Rossi | 296/37.6 |
| 5,232,259 | 8/1993 | Booker | 296/37.6 |
| 5,232,913 | 10/1993 | Metivier | 296/37.6 |
| 5,271,656 | 12/1993 | Hull et al. | 296/50 X |

FOREIGN PATENT DOCUMENTS

| | | |
|---|---|---|
| 834049 | 3/1952 | Germany. |
| 692147 | 5/1953 | United Kingdom. |
| 774224 | 5/1957 | United Kingdom. |

*Primary Examiner*—Joseph Pape
*Attorney, Agent, or Firm*—Richard C. Litman

[57] ABSTRACT

A mounting system for a conventional tailgate of a pick-up truck is capable of securing the tailgate within the cargo bay of the truck and at the same time utilize the tailgate to provide a short bed or containment area within the cargo bed. Two top brackets are secured to opposing sidewalls of the cargo area. The brackets extend towards each other and provide for pivotal mounting of the tailgate. Two stop brackets attached to the cargo bed floor limit the motion of the tailgate mounted on the top brackets. In an alternative embodiment, the top bracket and bottom brackets are secured to two elongated brace members before being secured with the cargo bed.

6 Claims, 4 Drawing Sheets

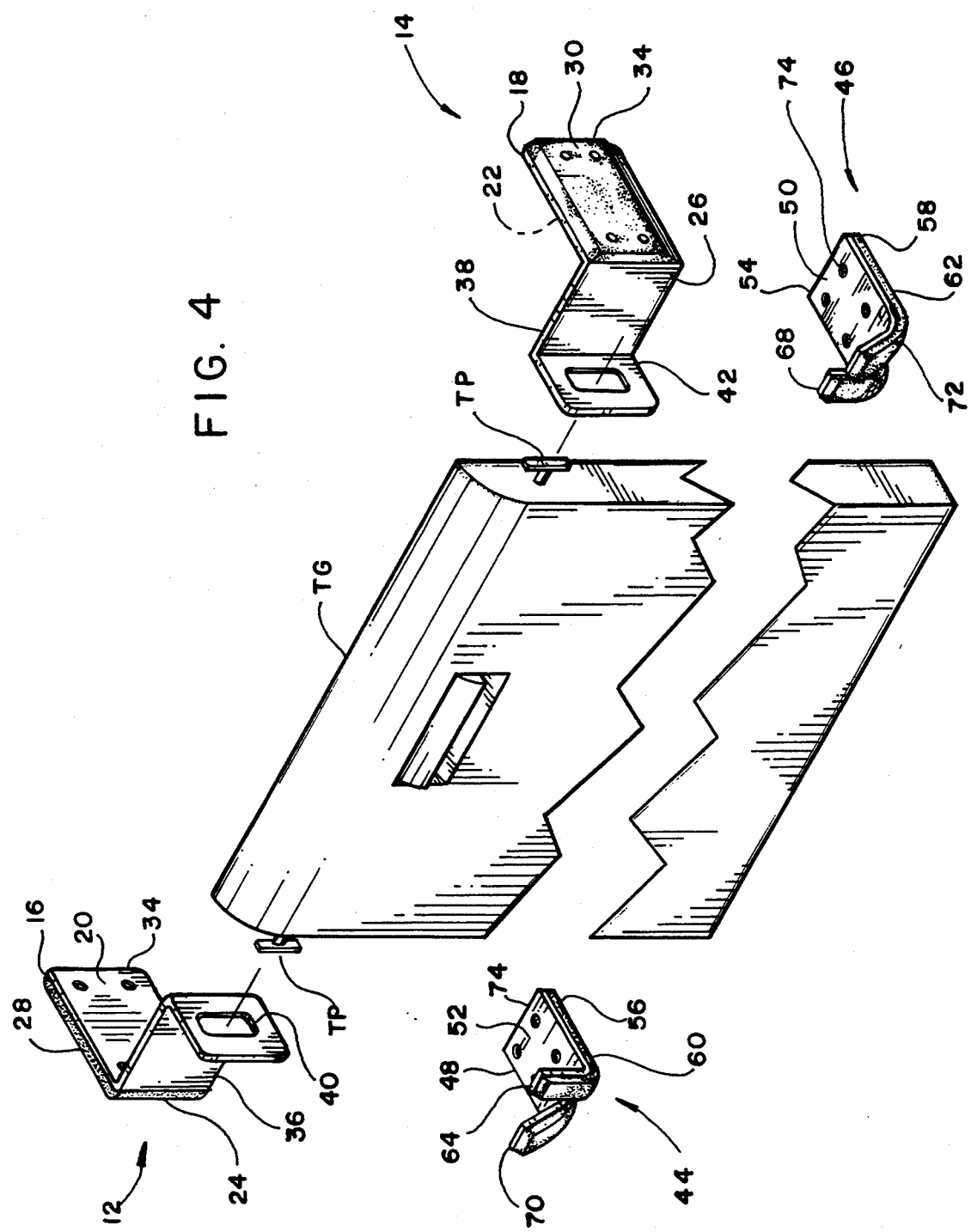

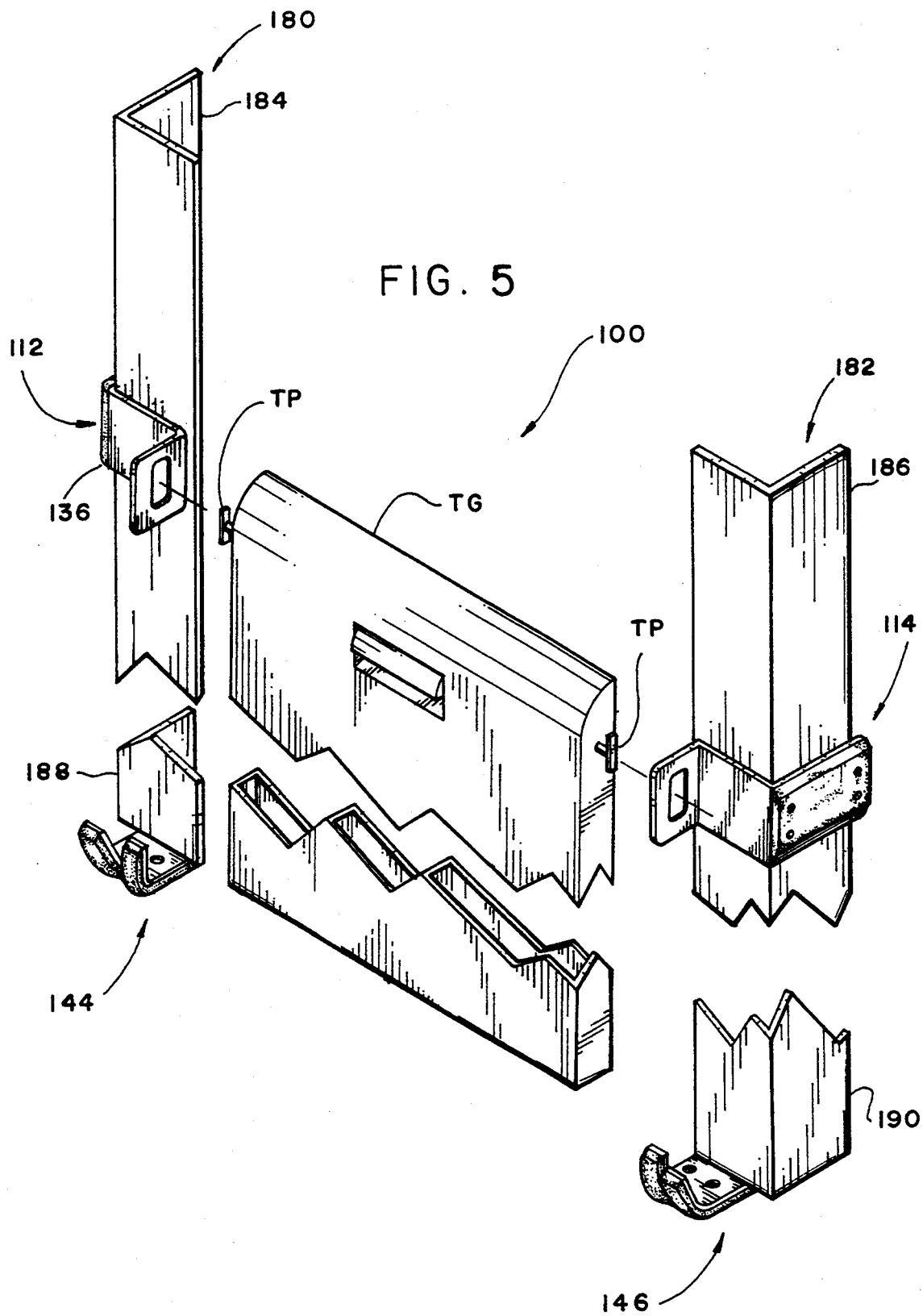

PICKUP TAILGATE MOUNTING ASSEMBLY

BACKGROUND OF THE INVENTION

1. Field of the Invention

The present invention relates to mounting devices for securing a tailgate to a pick-up truck, and more particularly to a mounting system for a tailgate which permits that tailgate to be stored and utilized within the truck bed between the sidewalls of the truck bed.

2. Description of the Prior Art

Pick-up trucks are widely used in both urban and rural area and are becoming more popular each day. These trucks are use to carry everything from garden tools to heavy machinery.

The pick-up truck utilizes a tailgate at the rear of the cargo bed which is pivotally mountable to the sidewalls of the cargo bed. When the tailgate is in the up position, it serves as a rear wall for the cargo bed. When in the down position, the tailgate is out of the way for loading and unloading of the cargo bed.

While the tailgate is clearly an important part of a typical pick-up, its use is not entirely without compromise. One major compromise is that of fuel economy. When a pick-up truck is operating at highway speed with the tailgate in its up position, considerable wind-drag is generated which reduces the fuel economy of the truck. The tailgate in the up position also blocks a substantial area of view of the driver when backing-up the pick-up truck. Yet, operation of the pick-up with the tailgate down position is not safe, and the removal of the tailgate, while facilitated by quick connection fittings presently in use, is of dubious value as the tailgate must be stored somewhere and may not be available when it is needed.

Another problem associated with the pick-up truck concerns the transport of small objects which fail to fill the entire cargo bed. The sidewalls of the truck limit the movement of large items but do not limit the movement of small items. These small objects have a tendency to shift during transport, resulting in damage to the object or the sidewalls of the truck. In addition, the shifting of the objects in the cargo bed may distract the driver from his driving.

Therefore, devices have been developed in an attempt to adapt a cargo bed for use in carrying smaller objects. Other devices have been developed to eliminate the problems associated with the tailgate of the pickup truck.

U.S. Pat. No. 5,039,154, issued to Barton E. Lewis on Aug. 13, 1991, discloses a Tailgate Mounting System which includes two mounting brackets each having a base for mounting the on the top end of a respective sidewall of a pick-up truck cargo bed. The brackets allow a conventional tailgate to be secured across the top of a cargo bed. Once secured, the tailgate may function as a seat or a cover for the cargo bed. The brackets of this invention, unlike the present invention, fail to allow the tailgate to be used to provide a small storage compartment within the cargo bed of the truck.

U.S. Pat. No. 5,207,469, issued to Marc A. Rossi on May 4, 1993, discloses a Truck Bed Storage Unit designed to fit in the bed of a truck in a location adjacent to the tailgate or end of the truck. This invention, however, fails to allow use of an existing tailgate to define a containment area or short bed within the cargo bed of the truck.

U.S. Pat. No. 5,232,259, issued to Robert F. Booker on Aug. 3, 1993, discloses a Truck Bed Air Deflecting Tool Box arranged for mounting onto a truck bed floor adjacent to the tail gate. The Air Deflecting Tool Box reduces the air drag associated with the tailgate, but does not provide for convenient storage of a tailgate that has been removed from the rear of the truck.

U.S. Pat. No. 5,253,913, issued to Pierre Metivier on Oct. 19, 1993, discloses a Truck Bed Partition that includes a cargo cage pivotally mounted to the sidewalls of a truck bed by mounting members. The invention of this patent adapts a truck bed for use in carrying small loads, but does not allow use of an existing tailgate for such a purpose.

U.S. Pat. No. 5,271,656, issued to Harold L. Hull et al. on Dec. 21, 1993, discloses a Multi-Positionable, Flexible Tailgate for a pickup truck that can be removably located at multiple positions within the truck bed. The invention of this patent, however, does not allow an existing conventional tailgate to be relocated within the truck bed.

Great Britain Patent Document No. 774,224, published May 8, 1957, discloses Improvements relating to Fastening Devices for Hinged Drop-Sides or Tail-Boards of Vehicles that includes a peg or projection adapted to be secured to a fixed pillar of a vehicle and engaged by an eye or staple on a hinged part.

Other relevant patents documents include German Patent Document No. 834,049 issued Mar. 17, 1952, and Great Britain Patent Document No. 692,147, published May 27, 1953.

None of the above inventions and patents, taken either singly or in combination, is seen to describe the instant invention as claimed.

SUMMARY OF THE INVENTION

The tailgate mounting assembly of the present invention includes structure that allows a conventional tailgate, removed from the rear of a pickup truck, to be secured within the cargo bed of the truck. The tailgate mounting assembly provides for convenient storage of the tailgate away from rear of the truck and also provides a containment area for small loads transported by the pickup truck.

The assembly has two top brackets, one mounted on each sidewall of the cargo bed near the top of the sidewalls. Each top bracket includes a base and an arm extending from the base. The arms include apertures dimensioned to except the standard connection projections extending from both side of a tailgate. The tailgate, once removed from the rear of the truck, may be pivotally mounted on the top brackets within the cargo bed. Bottom brackets secured to the floor of the cargo bed limit the pivotal movement of the tailgate when mounted on the top bracket. The mounted tailgate, the sidewalls, and the cab wall define a short bed.

Accordingly, it is a principal object of the invention to provide a tailgate mounting assembly that provides for convenient storage of the tailgate away from the rear of the pickup truck while at the same time providing a containment area for small loads.

It is another object of the invention to provide a tailgate mounting assembly for pivotally mounting the tailgate between the sidewalls of the cargo bed of a vehicle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is an exploded view showing the assembly in conjunction with a tailgate.

FIG. 5 is an exploded view of an alternative embodiment.

Similar reference characters denote corresponding features consistently throughout the attached drawings.

DETAILED DESCRIPTION OF THE PREFERRED EMBODIMENTS

Figure 1:
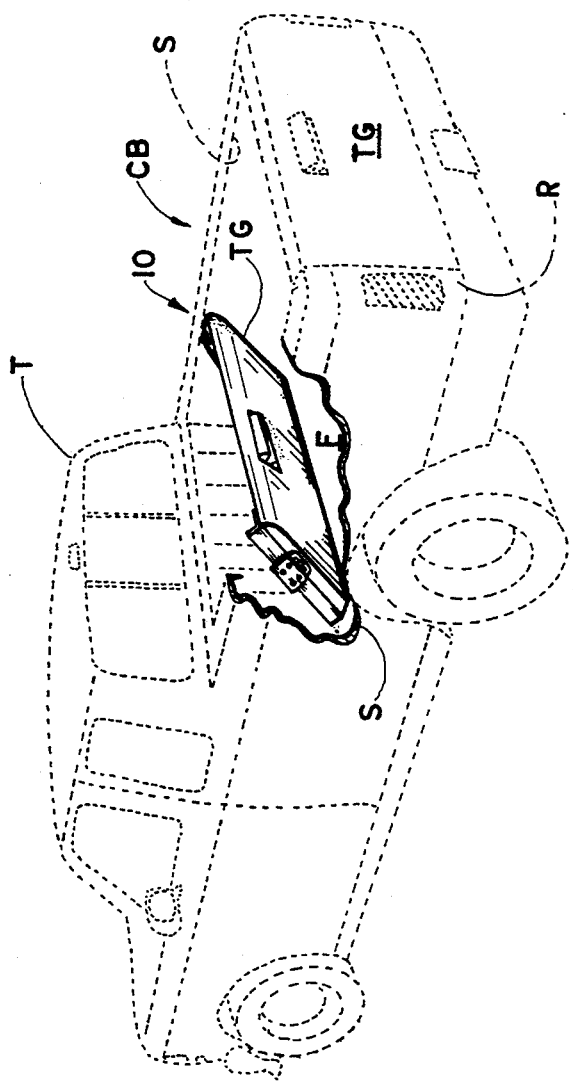
FIG. 1 is an environmental perspective view showing a tailgate removed from the rear of a pickup and mounted in the cargo bed using the tailgate mounting assembly of this invention.

Referring now to the drawings, FIG. 1 shows the tailgate mounting system 10 according to the present invention in operation in connection with a pickup truck T. However, the invention may be used in conjunction with any vehicle having a cargo bed and a tailgate. The tailgate mounting system 10 provides structure for securing the tailgate TG within the cargo bed CB of the pickup truck T. The typical pickup truck T, as shown in FIG. 1 includes a cargo bed CB defined by sidewalls S, a cargo bed floor F, a rear end R, and a tailgate TG' attached to the rear end R. The conventional tailgate TG' may be opened, closed, or removed from the rear of pickup truck. Tailgate projections TP on each side of the tailgate TG, as best shown in FIG. 4, facilitates latching the tailgate TG in the closed position and removable interconnection with the rear R of the pickup truck T.

The tailgate mounting assembly 10 provides top brackets 12,14 for mounting of the tailgate TG at a second location in the cargo bed CB, other than the rear R of the truck. As best shown in FIG. 4, the tailgate mounting assembly includes a first top bracket 12 and second top bracket 14. Each top bracket 12,14 includes a bracket base 16,18 having front surface 20,22 and a back surface 24,26. Each back surface 24,26 is structured for interfacing with a sidewall S the vehicle and may include a pad 28,30 of rubber-like material between the back surface 24,26 and a sidewall S to prevent marring and possible corrosion due to metal to metal contact. Each back surface 24,26 is secured to a sidewall S by screws 32 inserted through apertures 34 in each base 16,18 and screwed into a sidewall S. A back surface of one of the top brackets may also be secured to the side wall by a clamping member, an adhesive, or other conventional means. Each top bracket 12,14 also includes a bracket arm 36,38 extending from each front surface 20,22. Each bracket arm 36,38 includes a bracket aperture 40,42 dimensioned for acceptance of one of the tailgate projections TP of the tailgate TG.

To use the tailgate mounting assembly 10, the top brackets 12,14 are secured to opposite sidewalls S approximately three or four inches from the top of each sidewall S. Once the top brackets 12,14 have been secured to the sidewalls S, the tailgate TG' may be removed from the rear R of the cargo bed and secured between the top brackets 12,14. The user inserts the tailgate projections TP into the apertures 40,42 of the top brackets 12,14 to pivotally mount the tailgate TG.

The pivotal movement of the tailgate TG mounted on the brackets 12,14 may be limited by a pair of bottom brackets 44,46 mounted on the cargo bed floor F. As shown in FIG. 4, each bottom bracket 44,46 includes a base 48,50 with a top surface 52,54, a bottom surface 56,58, a pad 60,62 of rubber-like material attached to each bottom surface 56,58, a stop finger 64,68 extending perpendicularly upward from each top surface 52,54, and a guide finger 70,72 extending upwardly at an angle of approximately 45 degrees from each top surface 52,54. The stop fingers 64,68 limit the pivotal motion of the tailgate TG towards the rear R of the truck, while the guide fingers 70,72 limit the lateral motion of the tailgate TG towards the sidewalls S. The bottom brackets 44,46 are secured to the cargo bed floor F by screws 32 inserted through the base apertures 74 and screwed into the cargo floor F. The bottom brackets 44,46 may also be glued or welded to the cargo bed floor F. The bottom brackets 44,46 could be secured by other means, including the use of an adhesive or welding. Other means for limiting the movement of the rotation of the tailgate TG could include a stop (not shown) attached to at least one the sidewalls S at a location below the top brackets 12,14 but within the path of rotation of the tailgate TG.

Figure 6:
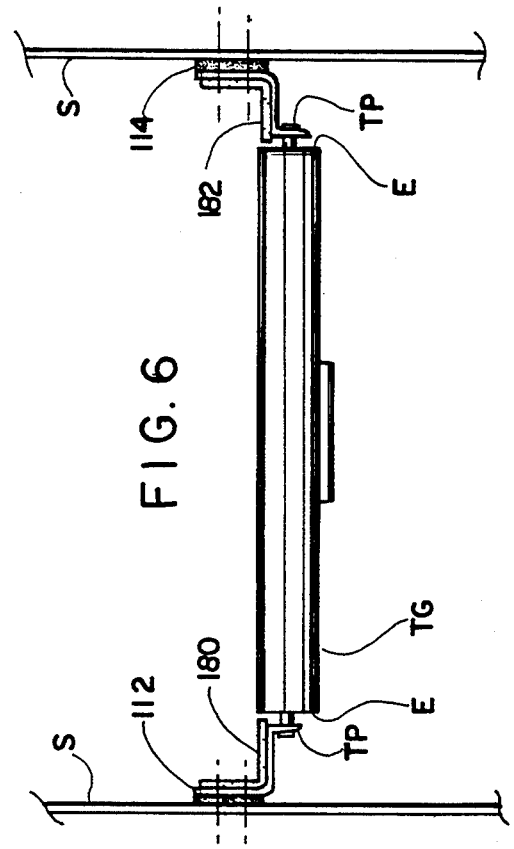
FIG. 6 is a top plan view of the alternative embodiment in the vertical position mounted to the sidewalls of the cargo bay pickup truck.
Figure 2:
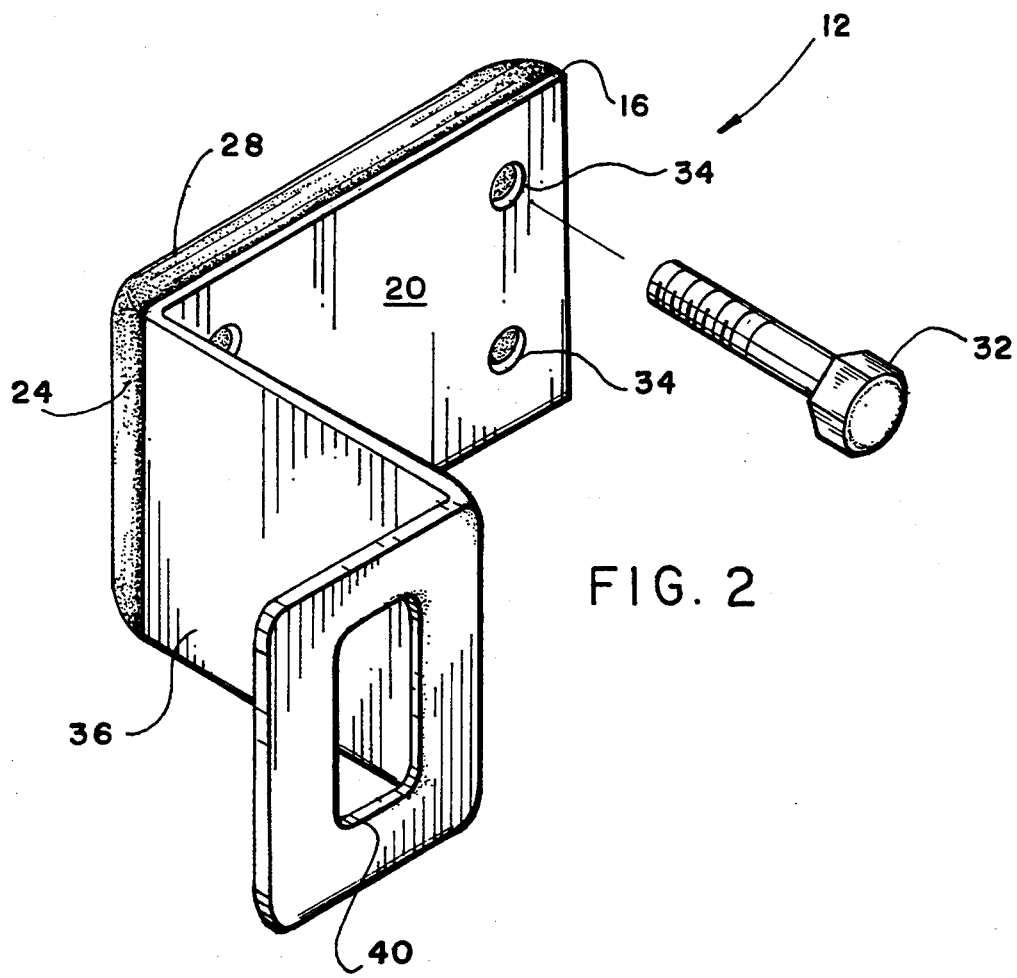
FIG. 2 is a perspective of the top mounting bracket.
Figure 3:
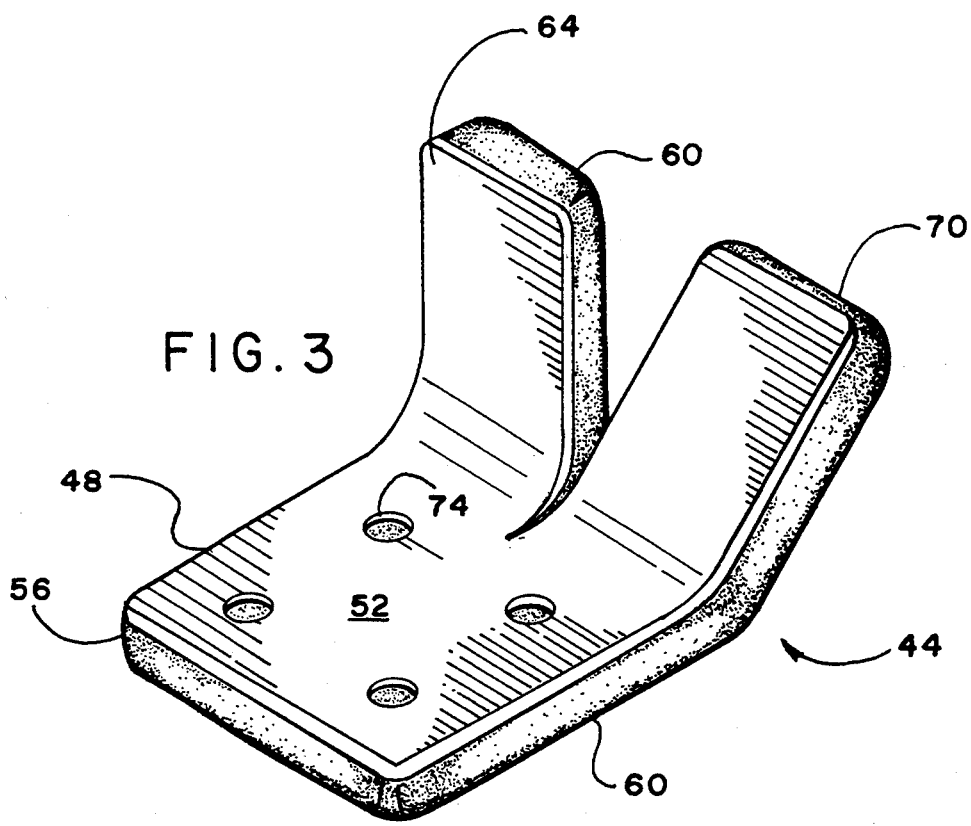
FIG. 3 is a perspective view of the bottom mounting bracket.

In a second embodiment, as shown in FIGS. 5 and 6, the tailgate mounting assembly 100 includes a pair of elongated braces 180,182 with L-shaped cross-sections. Each brace 180,182 includes an upper end 184,186 and a lower end 188,190. One of the bracket arms 136,138 of each top bracket 112,114 is attached to an upper end 184,186 of each brace 180,182, and a bottom bracket 144,146 is attached to the lower end 188,190 of each brace 180,182. As described for the first embodiment, the top brackets 112,114 are attached to the sidewalls S and the bottom brackets 144,146 are attached to cargo bed floor F. The braces 180,182, eliminate the gap between the edges E of the tailgate T and the sidewalls S, preventing cargo from rolling out of the short bed defined by the sidewalls S, cab C, and tailgate TG.

It is to be understood that the present invention is not limited to the embodiments described above, but encompasses any and all embodiments within the scope of the following claims.

What is claimed is:

1. A tailgate mounting assembly for mounting a tailgate in a vehicle, the vehicle including a cargo bed defined by a first sidewall, a second sidewall, a cargo bed floor, and a rear end, and the tailgate including a first tailgate projection on a first tailgate side for removable interconnection with the rear of the vehicle and a second tailgate projection on a second tailgate side for removable interconnection with the rear of the vehicle, wherein the tailgate is conventionally mounted at the rear end and said tailgate mounting system provides mounting of the tailgate at a second location in the cargo bed, said tailgate mounting assembly comprising:

a first top bracket, said first top bracket including
  a first bracket base, said first bracket base having a first front surface and a first back surface, said first back surface structured for interfacing with the first sidewall of the vehicle, means for securing said first back surface to the first sidewall, and a first bracket arm extending from said first front surface, said first bracket arm including a first bracket aperture dimensioned for acceptance of the first tailgate projection on the first tailgate side; and a second top bracket, said second top bracket including a second bracket base, said second bracket base having a second front surface and a second back surface, said second back surface structured for interfacing with the second sidewall of the vehicle, means for securing said second back surface the second sidewall, and a second bracket arm extending from said second front surface, said second bracket arm including a second bracket aperture dimensioned for acceptance of the second tailgate projection on the second tailgate side, wherein the first tailgate projection is removably secured within said first bracket aperture and said second tailgate projection is removably secured within said second bracket aperture to pivotally mount the tailgate between the first sidewall and the second sidewall of the cargo bed of the vehicle.

2. The tailgate mounting assembly according to claim 1, including stopping means for limiting a pivotal movement of the tailgate when the tailgate is pivotally mounted between the first sidewall and the second sidewall of the cargo bed of the vehicle.

3. The tailgate mounting assembly according to claim 2, wherein said stopping means includes, a first bottom bracket, said first bottom bracket including a first base having a first top surface and a first bottom surface, a first stop finger extending upwardly from said first top surface, a first guide finger extending upwardly said first top surface, and means for securing said first bottom surface to the cargo floor of the vehicle, and a second bottom bracket, said second bottom bracket including a second base having a second top surface and a second bottom surface, a second stop finger extending upwardly from said second top surface, a second guide finger extending upwardly from said second top surface, and means for securing said second bottom surface to the cargo floor of the vehicle.

4. The tailgate mounting assembly according to claim 3, wherein said first top bracket includes a pad of rubber-like material attached to said first back surface, said second top bracket includes a pad of rubber-like material attached to said second back surface, said first bottom bracket includes a pad of rubber-like material attached to said first bottom surface, and said second bottom bracket includes a pad of rubber-like material attached to said second bottom surface.

5. The tailgate mounting assembly according to claim 3, including a first brace having an L-shaped cross-section, said first brace having a first upper end and a first lower end, said first bracket arm of said first upper bracket attached to said first upper end, said first bottom bracket attached to said first lower end, and a second brace having a L-shaped cross-section, said second brace having a second upper end and a second lower end, said second bracket arm of said second upper bracket attached to said second upper end, said second bottom bracket attached to said second lower end.

6. A tailgate mounting assembly for mounting a tailgate in a vehicle, the vehicle including a cargo bed defined by a first sidewall, a second sidewall, a cargo bed floor, and a rear end, and the tailgate including a first tailgate projection on a first tailgate side for removable interconnection with the rear of the vehicle and a second tailgate projection on a second tailgate side for removable interconnection with the rear of the vehicle, wherein the tailgate is conventionally mounted at the rear end and said tailgate mounting system provides mounting of the tailgate at a second location in the cargo bed, said tailgate mounting assembly comprising:

a first top bracket, said first top bracket including a first bracket base, said first bracket base having a first front surface and a first back surface, said first back surface structured for interfacing with the first sidewall of the vehicle, a first back pad of rubber-like material attached to said first back surface, means for securing said first back surface to the first sidewall, and a first bracket arm extending from said first front surface, said first bracket arm including a first bracket aperture dimensioned for acceptance of the first tailgate projection on the first tailgate side;

a second top bracket, said second top bracket including a second bracket base, said second bracket base having a second front surface and a second back surface, said second back surface structured for interfacing with the second sidewall of the vehicle, a second back pad of rubber-like material attached to said second back surface, and means for securing said second back surface the second sidewall, and a second bracket arm extending from said second front surface, said second bracket arm including a second bracket aperture dimensioned for acceptance of the second tailgate projection on the second tailgate side, wherein the first tailgate projection is removably secured within said first bracket aperture and said second tailgate projection is removably secured within said second bracket aperture to pivotally mount the tailgate between the first sidewall and the second sidewall of the cargo bed of the vehicle;

stopping means for limiting a pivotal movement of the tailgate when the tailgate is pivotally mounted between the first sidewall and the second sidewall of the cargo bed of the vehicle, said stopping means including a first bottom bracket, said first bottom bracket including a first base having a first top surface, a first bottom surface, a first bottom pad of rubber-like material attached to said first bottom surface, a first stop finger extending upwardly from said first top surface, a first guide finger extending upwardly said first top surface, and means for securing said first bottom surface to the cargo floor of the vehicle, a second bottom bracket, said second bottom bracket including a second base having a second top surface, a second bottom surface, a second bottom pad of rubber-like material attached to said second bottom surface, a second stop finger extending upwardly from said second top surface, a second guide finger extending upwardly from said second top surface, and means for securing said second bottom surface to the cargo floor of the vehicle;

a first brace having an L-shaped cross-section, said first brace having a first upper end and a first lower end, said first bracket arm of said first upper bracket attached to said first upper end, said first bottom bracket attached to said first lower end; and a second brace having a L-shaped cross-section, said second brace having a second upper end and a second lower end, said second bracket arm of said second upper bracket attached to said second upper end, said second bottom bracket attached to said second lower end.

* * * * *